United States Patent
Daniel et al.

(10) Patent No.: US 9,678,642 B2
(45) Date of Patent: Jun. 13, 2017

(54) METHODS OF CONTENT-BASED IMAGE AREA SELECTION

(71) Applicant: Lexmark International, Inc., Lexington, KY (US)

(72) Inventors: Stuart Willard Daniel, Lexington, KY (US); Ahmed Hamad Mohamed Eid, Lexington, KY (US); Shaun Timothy Love, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 158 days.

(21) Appl. No.: 14/725,248

(22) Filed: May 29, 2015

(65) Prior Publication Data

US 2016/0349968 A1    Dec. 1, 2016

(51) Int. Cl.
G06K 9/34 (2006.01)
G06F 3/0484 (2013.01)
G06K 9/46 (2006.01)
G06F 3/0488 (2013.01)

(52) U.S. Cl.
CPC ........ *G06F 3/04842* (2013.01); *G06F 3/0488* (2013.01); *G06K 9/4604* (2013.01)

(58) Field of Classification Search
None
See application file for complete search history.

(56) References Cited

U.S. PATENT DOCUMENTS

| 5,410,611 | A | * | 4/1995 | Huttenlocher | G06K 9/32 382/177 |
| 6,240,197 | B1 | | 5/2001 | Christian | |
| 6,826,305 | B2 | * | 11/2004 | Zhu | G06K 9/00456 382/170 |
| 7,171,625 | B1 | * | 1/2007 | Sacchi | G06F 3/0481 345/157 |
| 7,609,885 | B2 | | 10/2009 | Hovden | |
| 8,023,755 | B2 | | 9/2011 | Wagner | |
| 2003/0179235 | A1 | * | 9/2003 | Saund | G06F 3/0481 715/764 |
| 2009/0228842 | A1 | * | 9/2009 | Westerman | G06F 3/04883 715/863 |
| 2010/0293460 | A1 | * | 11/2010 | Budelli | G06F 3/04883 715/702 |
| 2012/0131520 | A1 | * | 5/2012 | Tang | G06F 3/04842 715/863 |

* cited by examiner

Primary Examiner — Andrae S Allison

(57) ABSTRACT

A system and methods for selecting a region of pixels in an image displayed on a touch-sensitive interface is disclosed. The method for selecting the region of pixels is based on determined connectivity of pixels in the image indicating content of the image and includes determining connected pixels on the image representing the content without performing character recognition, detecting a text selection gesture indicative of selecting the region in the image, determining coordinates of the text selection gesture performed on the touch-sensitive interface and selecting the region in the image by bounding a first set of pixels located at a proximity from the coordinates of the text selection gesture.

4 Claims, 6 Drawing Sheets

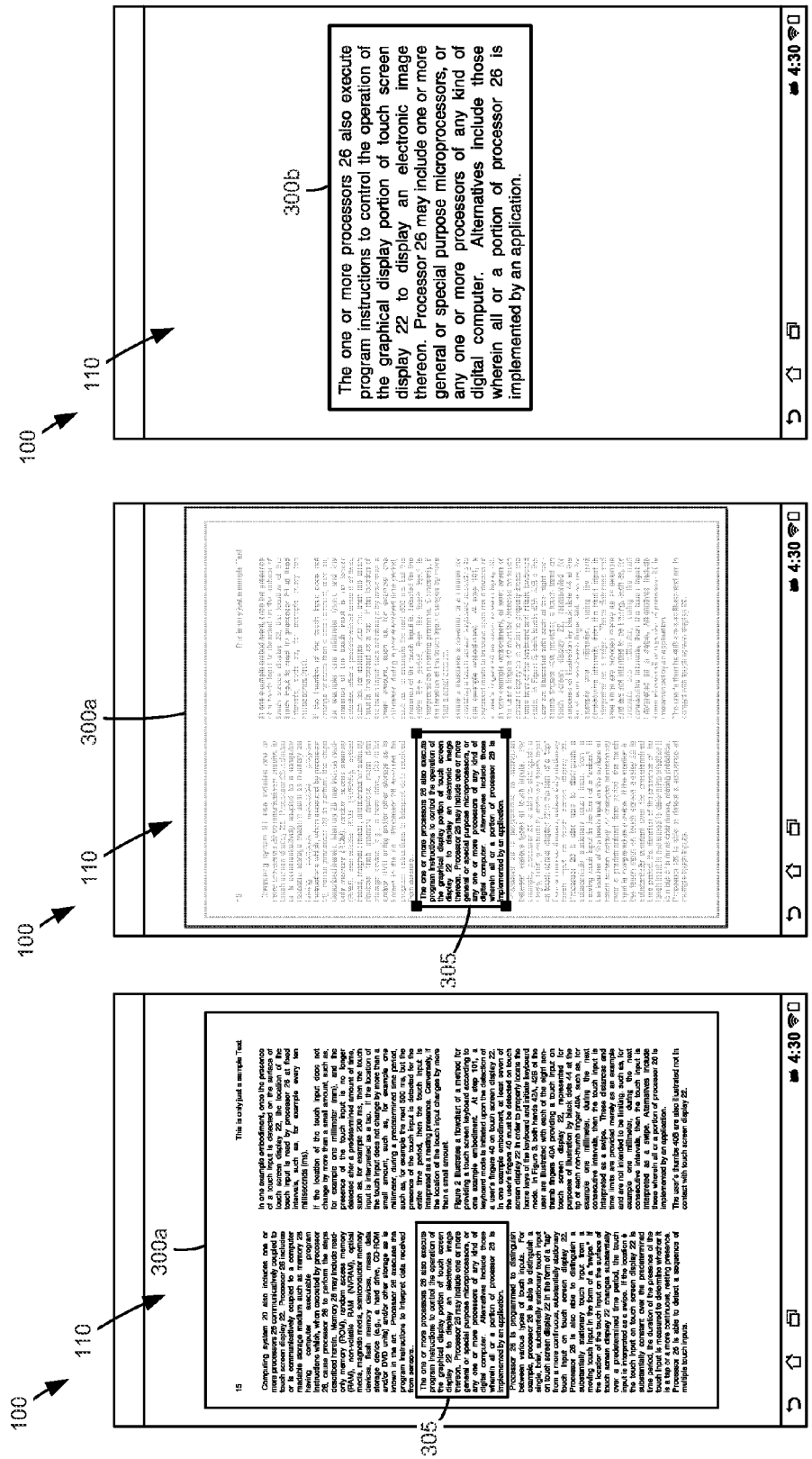

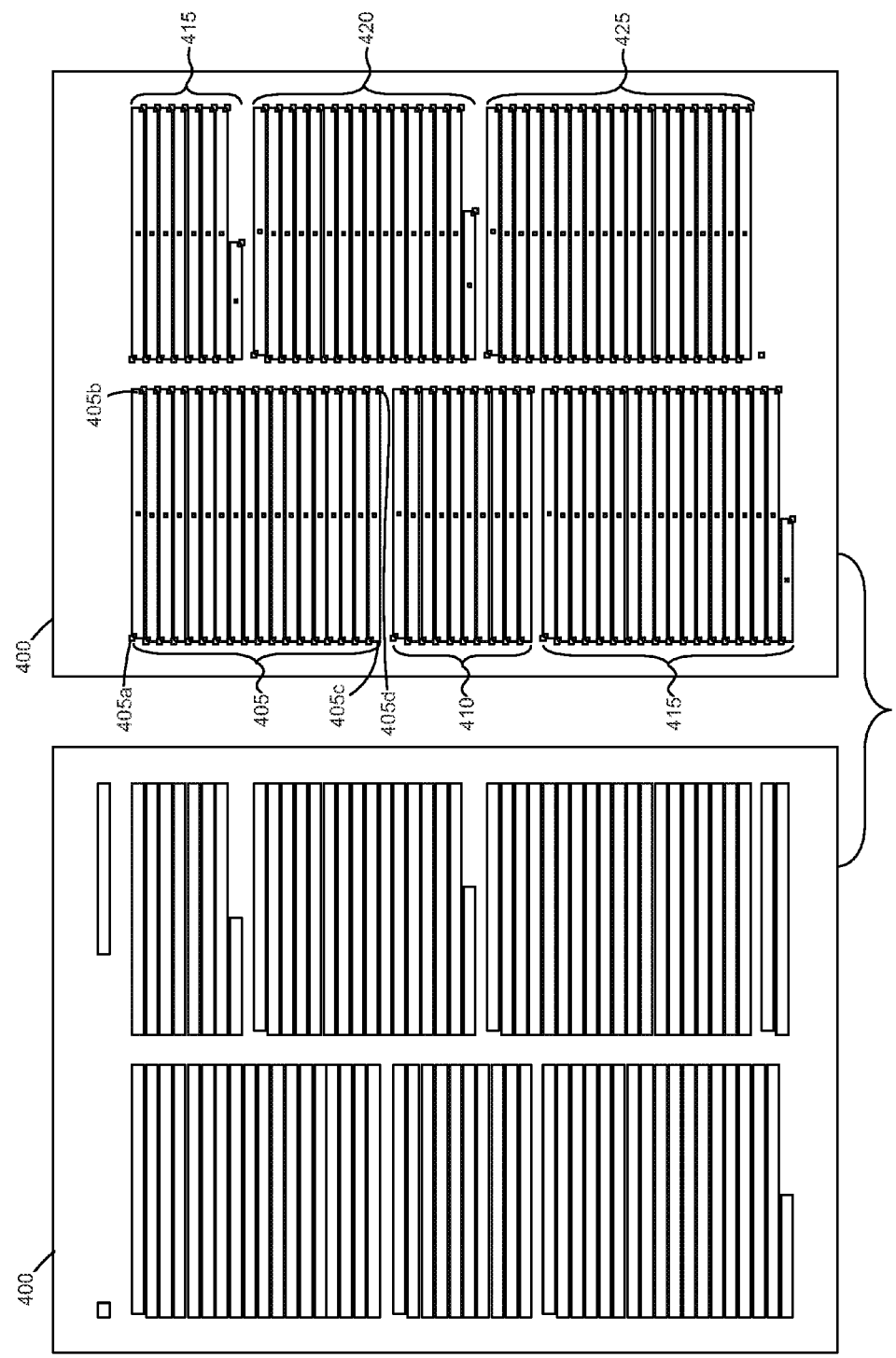

METHODS OF CONTENT-BASED IMAGE AREA SELECTION

FIELD OF THE INVENTION

The present invention relates to image area selection. More particularly, it relates to content-based methods of selecting a region of interest in an image.

BACKGROUND

When working with original text documents, a user may need to select a specific region of interest within the document to perform one or more various operations on the region such as cut, copy and/or erase. When selecting a region of interest (ROI) in a text document, sections of text can be selected by moving a cursor over the desired sections to highlight the selected sections. The user is then able to perform various operations on the highlighted sections. The sections of text are easier to select on original text documents since text documents have characters at specific locations in the document wherein a cursor moving over those locations can select those characters.

On some devices such as, for example, mobile devices, printed text documents may be captured as images so as to have an electronic copy of the documents which may be easier to manage than the physical paper copies. These electronic documents are different than the original text documents because they are in an image format and therefore have no text information with which a cursor may be used to easily select regions of interest using the typical movement as discussed above and as is known in the art. In a captured image of a text document, there are no inherently-provided character locations to enable cursor selection.

To obtain text information and enable the user to select a region of interest in an image, optical character recognition (OCR) may be performed. However, OCR can be an expensive operation. An OCR operation typically starts by attempting to identify connected components representing characters then performing a correlation to identify what the characters represent. Other operations such as dictionary searches are also performed to reconstruct the original text, thereby allowing the user to select regions of interest in the now reconstructed image document having text information. However, this additional processing may be unnecessary when performing a straightforward selection of a region of interest in an image. With devices having limited processing capabilities and power supply such as mobile devices, the additional processing to be performed in an OCR operation may be a significant burden when a user only requires a simple selection of a region in the image.

An alternative method of selecting a region of interest in an image is to use the cursor to encircle the desired ROI. The area may be encircled or the circle itself may be highlighted to indicate the selection and operations such as crop or erase may then be performed to the selected area. Accurately drawing a circle or another polygon around the region of interest may be difficult to do using non-traditional cursors such as those controlled by human fingers on touchscreen devices. Thus, poor selection results that are prone to errors may occur when this method of selection is used.

Accordingly, a need exists in the art for methods of accurately selecting text in an image of a document that correspond to a familiar method used in selecting text in original text documents without performing unnecessary operations such as those required in a typical OCR operation. One or more methods of accurately selecting a region of interest in an image using familiar or intuitive cursor movements typical to selecting a region of interest in a text document is needed in the art. Additional benefits and alternatives are also sought when devising solutions.

SUMMARY

The above-mentioned and other problems are solved by system and methods for selecting a region of pixels in an image displayed on a touch-sensitive interface based on content of the image. The methods may be performed on a computing device such as, for example, a mobile device. The method includes determining which pixels of the image indicate the content of the image without performing character recognition. A text selection gesture may then be received or detected on a region of pixels in the image having pixels that indicate the content of the image. The coordinates of the text selection gesture, which may be the coordinates of the cursor in the computing device that is used to perform the text selection gesture, are identified and the region of pixels is then selected by bounding a first set of pixels located at a specified proximity from the coordinates of the text selection gesture or the cursor. Additional processing may then be performed on the bounded first set of pixels such as, for example, erasing, cropping, copying, and the like.

These and other example embodiments are set forth in the description below. Their advantages and features will become readily apparent to skilled artisans. The claims set forth particular limitations.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 3A-3C show an example image that may be displayed on a touch-sensitive interface undergoing corrections.

FIG. 4 shows an example document wherein lines of text are extracted using known one or more morphology dilation filters to generate a binary image, including boundaries that are determined based on the extracted lines of text.

FIGS. 5A-5C show an example document image having a selected region of interest.

DETAILED DESCRIPTION OF THE ILLUSTRATED EMBODIMENTS

In the following detailed description, reference is made to the accompanying drawings where like numerals represent like details. The example embodiments are described in sufficient detail to enable those skilled in the art to practice the invention. It is to be understood that other example embodiments may be utilized and that changes, etc., may be made without departing from the scope of the disclosure. The following detailed description, therefore, is not to be taken in a limiting sense and the scope of the invention is defined only by the appended claims and their equivalents. In accordance with the features of the disclosure, systems and methods for using content of an image to select a region of pixels in the image displayed on a touch-sensitive interface are disclosed. The method for selecting a region in an image includes determining pixels on the image that indicate the content of the image. The determining of the pixel content of the image is performed without performing character recognition. The method further includes receiving a text selection gesture on the region in the image containing the pixel content, determining coordinates of the text selection gesture, and selecting the region in the image by bounding a first set of pixels located at a specified proximity from the coordinates of the text selection gesture.

Figure 1:
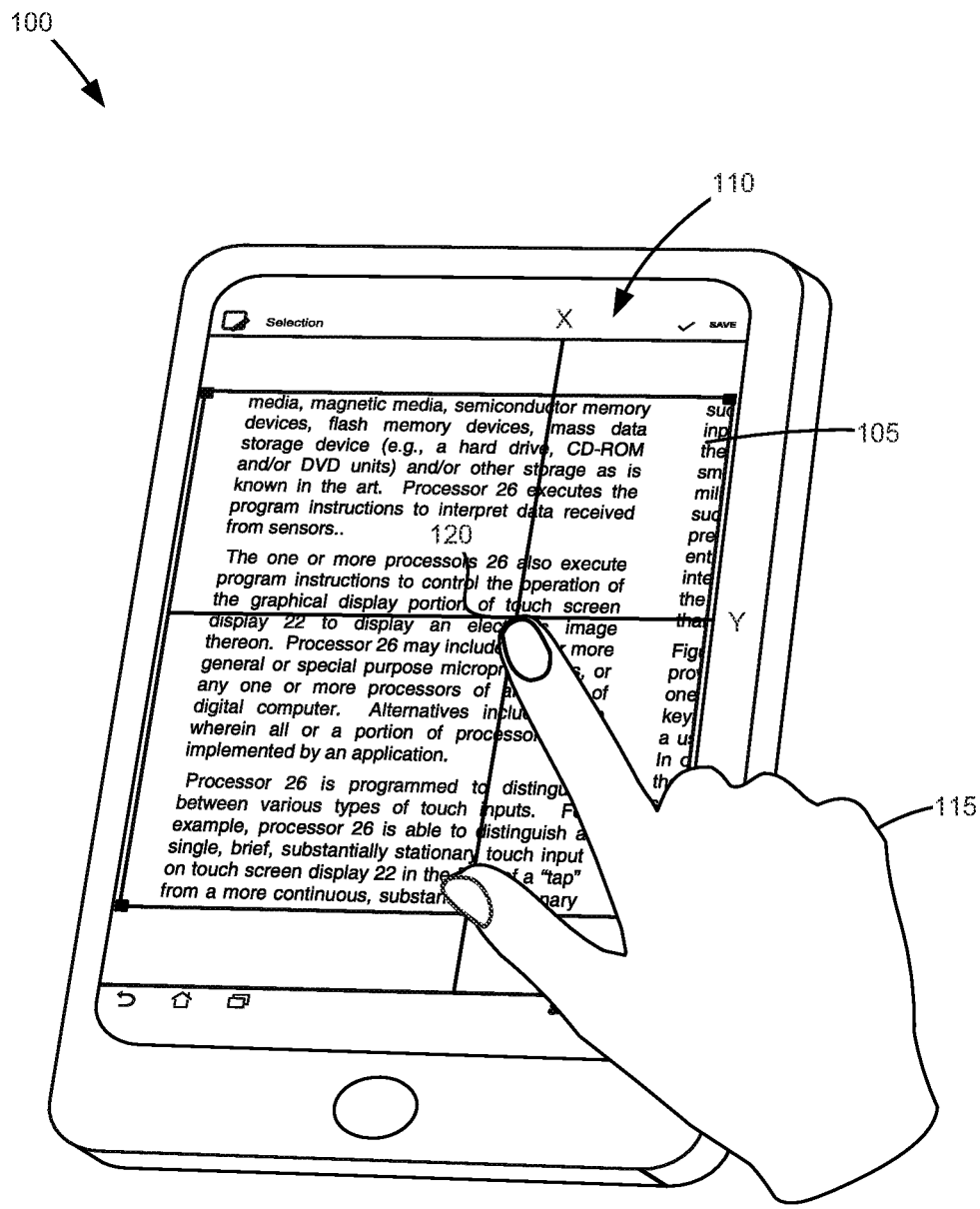
FIG. 1 shows an example computing device having an application that displays an image on a touch-sensitive display.

With reference to FIG. 1, there is shown a computing device 100 having an application installed therein capable of displaying an image such as, for example, document image 105. For illustrative purposes, computing device 100 may be a mobile device having a touch-sensitive display 110 including a touch sensor (not shown). A user 115 performs an input on the touch-sensitive display 110 of computing device 100 by touching the touch-sensitive surface with a finger or a stylus (not shown). Controlling a cursor 120 of computing device may be performed using the touch input for selecting a portion of an image in a similar manner to controlling a cursor using a mouse input device on a personal or laptop computer.

The touch-sensitive display 110 also recognizes tracks and/or patterns performed using the finger and/or the stylus on the touch-sensitive display 110. The touch-sensitive display 110 senses the touch input from the user 115, and recognizes the track or the pattern of the operation performed by user 115 while controlling the cursor 120 such as when selecting a region in document image 105 displayed on the screen. This information can be used by computing device 100 to execute predetermined functions on the selected region depending on how user 115 touches the display, as will be discussed in greater detail below. The coordinates of the cursor such as x and y coordinates 125a and 125a, respectively may also be determined based on the location of the finger and/or stylus against the touch-sensitive display 110.

Figure 2:
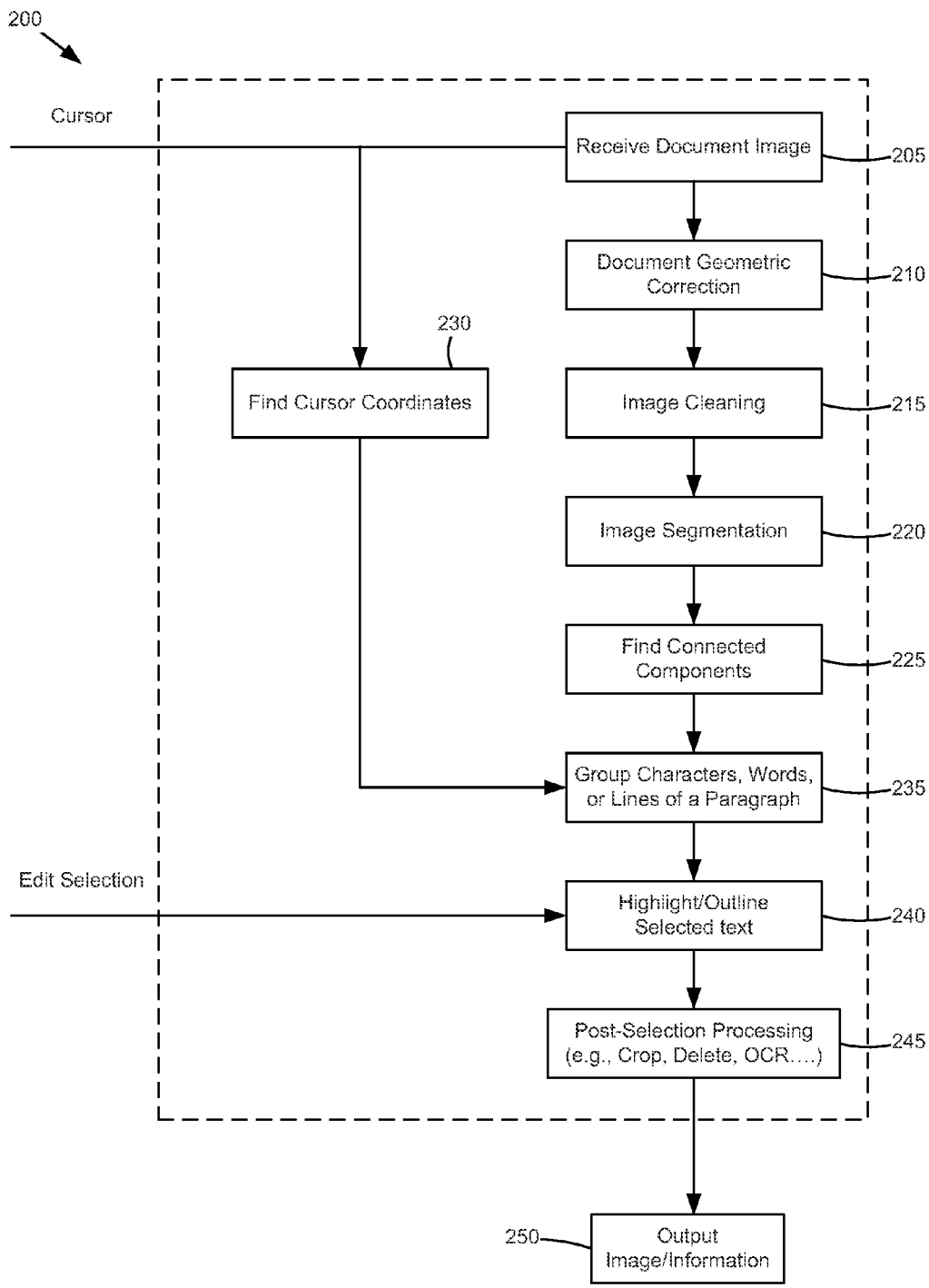
FIG. 2 shows an example method of selecting a region of interest in an image based on image content and cursor location.

FIG. 2 shows an example method 200 of selecting a region of interest in an image based on image content and cursor location. The region of interest may be a document or part of a document or any primarily textual portion of an image such as for example, captured forms, business cards, text, identification cards, and license plates, among many others. Using method 200, the document captured in the image may be identified, cleaned, extracted and a region of interest selected therein.

Method 200 may be performed using one or more computer program instructions executed by a processor of computing device 100 such as, for example, a mobile device. For illustrative purposes, method 200 is performed by a mobile device but it will be understood that other types of computing devices may perform the method. Other types of computing devices may include, but are not limited to, a personal computer, an image-capturing device, a tablet computer, an image-forming device or any device that includes a processor and a computer-readable medium, such as a random access memory (RAM), coupled to the processor. The processor may execute computer-executable program instructions stored in the memory.

At 205, an image such as, for example, a document image is received. Receiving the image may include accessing from a computer-readable storage medium an image captured by the mobile device. The mobile device may capture the image using a camera installed within the mobile device, or connected to a mobile device by means of a communications interface.

In an alternative example embodiment, the image may be received and/or retrieved by another application running in the mobile device. Receiving the image for processing may include receiving an image that has been uploaded to or downloaded by the mobile device from another application in the mobile device. In another alternative example embodiment, the image may be uploaded to or downloaded by the mobile device from another device connected to the mobile device.

The image received for processing may also be obtained from a number of other sources such as, for example, images scanned by a scanner, stored on fixed or portable computer-readable storage media, optical drives, storage devices accessed from media attached to a communication port of mobile device, or accessed from a network (e.g., a LAN, WAN or the Internet).

In one example embodiment, the image may be a document image having one or more sections having text in the form of character shapes. Processing the document image may include determining a document section in the image by identifying one or more connected character components for easier selection of an area within the image using familiar or intuitive cursor movements.

At 210, geometric correction may be applied to the image. Images captured using cameras such as, mobile device cameras, may experience different types of image distortion such as, for example, perspective or keystone distortion which may occur due to the central projection nature of the imaging device used to capture the image. The images may contain features having known geometry such as, for example, documents, identification cards, business cards, license plates, among others. These images may benefit from corner detection methods to find the distortion model, which may then be inverted to restore the object shape, thereby correcting the distortion in the image.

Automatic corner detection methods that may be used to identify corners may be, for example, Harris corner detection method or minimum Eigenvalue technique. Other corner detection methods that may be used to identify corners and find the distortion model of the image will be known in the art. The distortion model of the image may be found using one or more correction methods. In one example embodiment, the distortion model may be found by using eight degrees of freedom projective transformation.

After geometric correction of the image to correct a distortion, the image may be cropped to a region of interest. The region of interest may include the entire image. In an alternative example embodiment, the region of interest may include specific contents within the image indicative of a text or a document.

Cropping the image to a region of interest may be performed to provide an initial bounding box for corner detection techniques to help limit the area for selecting a region of interest. The cropping of the image may be performed automatically after the geometric correction. In another alternative example embodiment, the cropping may be performed using user assistance.

FIGS. 3A-3C show an example method of cropping an image to a region of interest. FIG. 3A shows an example image 300a displayed on touch-sensitive display 110 of computing device 100. Image 300a is an example captured image of a physical copy of a document having textual information and includes a graphic representation of text and/or a document containing information about the device. In an alternative example embodiment, image 300 may also contain other elements that may not be considered textual information, such as pictures.

At FIG. 3B, image may be cropped to only include a specific region within the image that is considered relevant to the user such as, for example, first portion 305, and exclude other elements in the image that the user may indicate as not part of the document he or she wishes to process. FIG. 3C shows an example cropped image 300*a* now containing only the first portion 305 that was cropped from FIGS. 3A and 3B.

In continued reference to FIG. 2, at 215, one or more image cleaning processes may be applied to the image such as, for example, adaptive tone correction. Tone correction may modify pixel values of the image in order for the darkest and lightest pixel values to be encoded using the minimum and maximum code values. In an alternative example embodiment, tone correction may convert a color in the original image to a grayscale representation of the pixel luminance values in the original image.

Images, such as those captured using cameras, may be negatively impacted by non-uniform illumination of one or more documents captured in the image. Adaptive tone correction may be performed to execute a local analysis of the document and determine potential background and contrast values. Varying correction may then be applied in different areas of the image based on pixel values.

In an alternative example embodiment, the document background identified in the image may be remapped to a constant value. This allows for a white balance correction in the image when the adaptive tone correction operation is performed on all three channels of an image such as, for example, an RGB image.

The image cleaning process may be applied to the entire image 300A received at 205 or, alternatively, only to the cropped image 300B.

At 220, image segmentation may be performed on the image. Image segmentation is performed to simplify the image and convert a representation of the image into a format that may be easier to analyze in conjunction to the example embodiment of the present disclosure. Image segmentation may be performed to assign a value or a label to pixels of the image such that pixels having substantially same values or labels may share one or more visual characteristics.

In an example embodiment, image segmentation may be a binarization of an image from a grayscale representation to black and white. For example, pixel values in the image having dark luminance may be represented by a black pixel, while pixel values having a light luminance may be represented by a white pixel.

Different segmentation algorithms may be used for segmenting the image such as, for example, the Otsu binary segmentation algorithm. Other segmentation algorithms that may be applied on the image will be known in the art.

In an example embodiment, the image may be segmented into one of a foreground and a background class. The background class may be one or more regions in the image containing a background of the image. The foreground class may be a region in the image that may be toward the front or nearest to the viewer. The foreground class may be an area in the image containing significant features that may be useful in identifying one or more documents in the image.

In another example embodiment, image morphology may be performed on the image to extract lines of textual information from the image. One or more morphology dilation algorithms may be performed on the binary image in order to detect and form lines of text represented by connected pixel components. After applying a morphology dilation algorithm, connected components features are then identified and a bounding box upper left corner, a bounding box lower right corner and a bounding box centroid can be computed from the image. Using these features, a paragraph may be selected. It will be understood that connected pixel components are pixels in the image that are at a specified proximity from each other, and may be considered as part of a word, paragraph and the like.

FIG. 4 shows an example document 400 wherein lines of text are extracted using known one or more morphology dilation filters to expand and make image objects such as text thicker. Applying morphology dilation filters allow character objects in the image to merge and form a set of connected characters (e.g. words). Morphology dilation filters may also be used to merge words into a set of connected words. The appropriate filter size is chosen to form a line of connected characters and will be known in the art. A connected component algorithm is then used to find a bounding box for each line of text, including the centroid and the coordinates of the four corners of the bounding box.

For example, document 400 may be determined to include bounding boxes 405, 410, 415, 420 and 425. Bounding box 405 includes an upper left corner 405*a*, an upper right corner 405*a*, a lower left corner 405*c* and a lower right corner 405*d* determined using one or more known connected component algorithms. Different bounding boxes may be identified based on a distance between two lines of text that is identified as greater than the distance between lines of text identified belonging to a paragraph. For example, the last line of bounding box 405 which is the line having lower left corner 405*c* and lower right corner 405*d* may have a distance from the first line of bounding box 410 that is greater than the distance between the lines comprising bounding box 405. The difference in the distance between the last line of bounding box 405 and the first line of bounding box 410 may then be used as a basis to identify that said lines belong to different bounding boxes, and subsequently, to different paragraphs in the document image.

In one alternative example embodiment, morphology dilation may be skipped, and a connected component algorithm may instead be used to find the bounding box for each character image object. Based on pre-determined thresholds, characters that belong to the same line of text are identified and a bounding box of the whole line of text of characters may be determined.

The foreground class determined based on the image segmentation process applied may then be analyzed to define one or more connected components in the image (at 225). The connected components may be classified into one of a text and non-text components. In an example embodiment, the image may be classified into edge and non-edge contents using, for example, the Sobel edge detector. Edge detection algorithms, as will be known in the art, may also be used to identify and classify contents in the image into edge and non-edge contents. User can then edit the classified components, for example, to optimize image file size or print document efficiently.

At 230, cursor coordinates are determined based on an input on a human interface device connected to the device performing method 200. The cursor may be a traditional cursor controlled by a mouse connected to the device. Other means of indicating location in an image through a human interface device will be known by skilled artisans. Receiving the cursor location includes determining the X and Y coordinates of the cursor within the image.

In one alternative example embodiment, a cursor may refer to a single or multi-touch gesture on a touch screen display in a device such as, for example, a mobile device. A text selection gesture may be performed by a user on the touch screen display such as, for example, a double tap text selection gesture wherein a user double taps an area at the touch screen wherein pixels of the image are displays. The double tap gesture causes the pixels to be selected as text as will be discussed below.

In another alternative example embodiment, a tap and hold text selection gesture may be performed to select a region in the image wherein pixels indicating content of the image are displayed. The tap and hold gesture may be performed wherein the user taps or touches an area in the touch screen display with a finger, the tapping performed adjacent or near a pixel content of the image. The pixel content located nearest where the tapping has occurred may indicate the region from which text selection is to begin. When the user maintains the finger pressure on the touch screen without releasing the finger pressure from the screen, a hold gesture can be said to be performed. Pixels that are located at the region the cursor covered while being moved while the hold gesture is being performed indicates the region of pixels that the user is requesting to select using the cursor. The user may slide his or her finger while maintaining pressure on the touch screen display to at least one of an up, down, left and right direction in order to facilitate selection of the pixels located between the coordinates from which the tap was first performed to the location where the hold gesture ended, as will be known by skilled artisans.

In one alternative example embodiment, the finding of connected components at 225 may be performed on an area having the cursor coordinates that is indicative of the region the user wishes to select. For example, a user may receive the document image and use the cursor to select a region of interest. As an alternative to defining and determining connected components for the entire image, another method may be used wherein the step of determining the connected components described at 225 may be performed only after the cursor coordinates are found, and the determining only performed on the region in and around the cursor coordinates.

At 235, the connected pixel components determined at 225 are grouped into at least one of characters, words, or lines of a paragraph. The connected components may be grouped into characters, words or lines of a paragraph based on the cursor coordinates determined at 230. The grouped connected components indicate the content in the image that is selected by the user and the connected components that will be grouped are the components located at a specified proximity from the cursor coordinates.

In one example embodiment, the grouping of the connected pixels may be performed using document layout analysis wherein regions in the image of the text document may be identified and categorized. The connected pixel components may be identified as either blocks of text or blocks of non-text content such as images. Document layout analysis may be performed wherein the raw pixel data of a document image is iteratively parsed into connected regions of black and white pixels, then the regions are then grouped into at least one or words, text lines, and text blocks such as, lines of a paragraph. In another example embodiment, the grouping of the connected pixels into words, or lines of a paragraph may be performed using a top-down approach wherein the pixel components are divided into columns and blocks based on white space and geometric information of the raw pixel data. Other methods of grouping the connected pixel components will be known to skilled artisans.

At 240, the connected pixel components, including those that have been grouped as at least one of characters, words or lines of paragraph are bounded to show the selection performed on the region of the image based on the cursor coordinates. The bounding of the selected pixels may be performed by outlining or highlighting the pixels that are located at a specified proximity from the coordinates of the cursor using a polygon such as, for example, a rectangular box that is overlaid on a region containing pixels located at the specified proximity from the coordinates of the cursor.

In one alternative example embodiment, the highlighting of the selected region of pixels may be enhancement or alteration of the appearance of the selected pixels such as, for example, bold, italics, underlining, changing the color of the pixels, or the background color of the selected region of pixels, among many others.

In one example embodiment, the bounding of the selected pixels may include bounding a second set of pixels that are located at a proximity that is less than a predefined threshold from the first set of pixels. Once the selected pixels, or pixels that are at a specified proximity from the cursor, are selected, it may be determined if there are neighboring connected pixel components from the selected pixels and upon positive determination, the neighboring connected pixel components may be included in the selection. The distance threshold between the selected pixels and the pixels that are considered neighboring pixels may be predefined.

Similarly, when the cursor moves from a first position in the image to a second position while a text selection gesture is being performed, the pixels that are located between the first position and the second position may be bounded to show selection. For example, a user may select a region of connected pixels in the image using a touch gesture on the touch screen display performed at a first cursor location. While the user contacts his or her finger at the first cursor coordinates in the touch screen display to indicate the first position, the user may drag his or her finger from the first position to a second position. The dragging from the first position to the second position is understood to be moving the finger from the first position to the second position without the finger leaving contact against the touch screen display. When this multi-touch gesture is determined to be performed on the image displayed on the touch screen display, the selecting is performed on the connected pixels that are located in an area at a specified proximity from the first position and the second position. If the gesture that corresponds to text selection moves from the first position to the second position when selecting the pixels indicating content of the image, the pixels that are located between the first position and the second position are bounded to indicate the selected region of interest.

Similarly, method 200 may also include determining if the text selection gesture performed on the image displayed on the touch screen display moves from a first position within the image to a second position at a lateral direction from the first position. For example, if the user performs a touch gesture on the touch-screen display that drags the cursor from a first position located at a first side of the image such as, for example, the left side, to a second position located at the right side, the region of interest to be selected and bounded extends horizontally to include the first set of connected pixel components located at a specified proximity from the first cursor position located at the left side, to a second set of connected pixel components located at a specified proximity from the second position located at the right side. It will be understood that the first position is the position from which the touch gesture was initiated by the user, and the second position is the last position of the touch gesture, or the coordinates where the user ends contact between his or her finger and the touch-screen display.

In one alternative example embodiment, the selection of a region in the image may include selecting regions having content that are determined to be textual. A layout analysis may be performed on the image to determine a textual or non-textual content (e.g. images), and upon detecting the text selection gestures on the image, the bounding may be performed only on regions that are determined to contain textual information.

Figures 5A, 5B, 5C:
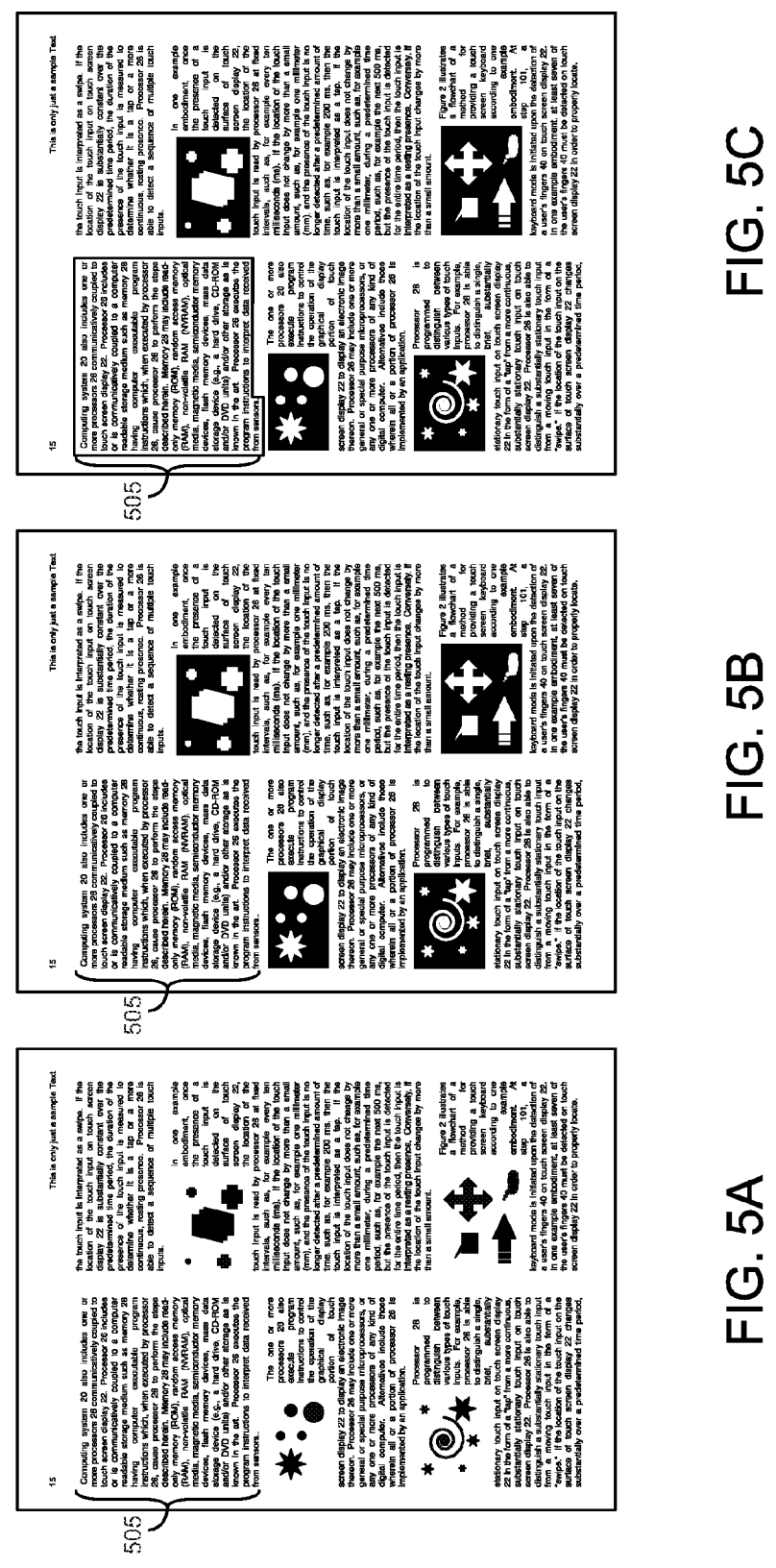

FIG. 5A shows the document image received at 205, FIG. 5B shows a binarized image where pixels indicating content of the image have been identified, and FIG. 5C shows a region of interest selected and bounded as shown in 505. Region of interest 505 has been selected by determining the pixel content in the image without performing optical character region. The selection is made using familiar cursor movements that are typically associated with selecting text on a document, or textual information on an image processed using OCR. When the selection has been made, the region of interest may be further processed.

Figure 6:
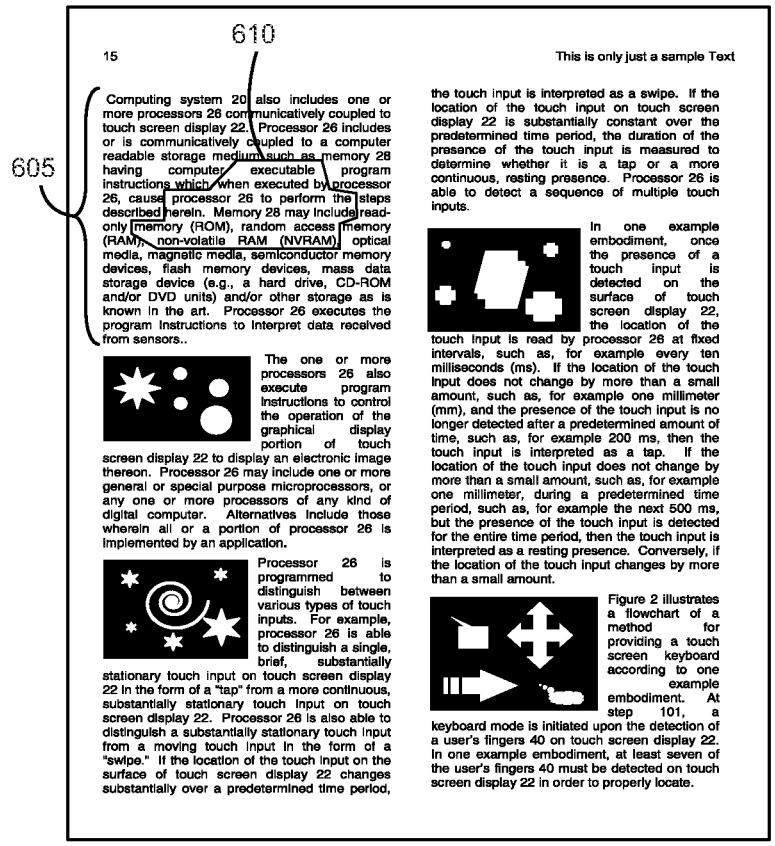
FIG. 6 shows an example embodiment of a document image that has been binarized and contains a selected region of interest.

In an alternative example embodiment, the user may select a group of connected characters (e.g. a sentence) that is located in the middle of a paragraph. In this example embodiment, characters that are located close to the left and right margins may have to be excluded in the selection. FIG. 6 shows an example embodiment of a document image that has been binarized and contains a selected region of interest 605 bounded by a non-rectangular polygon 610. In this example, the region of interest is located between pixels that are not part of the selection the user wishes to make. In this example, a rectangular polygon cannot be effectively used to highlight the selection without including the unwanted pixels. To effectively select the specific region of interest, the non-rectangular polygon 610 may be used to border only the pixels specified by the user-selection gesture to indicate selection. The non-rectangular polygon 610 may be used to border the pixels that are at a nearer proximity to the coordinates of the text-selection gesture made by the user. The proximity between the coordinates of the text-selection gesture and the pixels to be bounded may be set at a value wherein only the pixels located at a substantially small distance from the coordinates are bounded, thereby excluding the unwanted pixels from being selected using the non-rectangular polygon 610.

At 245, a post-selection processing may be performed on the selected pixels based on a gesture performed by the user using the cursor while the pixels are bounded. The post-selection processing may be at least one of a cropping, deleting, copying and OCR-processing of the selected region of pixels. Other post-selection processing that may be performed on the selected pixels will be known by skilled artisans. Each of the types of post-selection processing may be associated with a gesture such that when the gesture is received by the device while the region of pixels is selected, the type of post-selection processing associated with the gesture may be performed on the region of pixels.

For example, the "double tap" gesture may be associated with a cropping post-selection processing to be performed on the selected region of pixels. A patterned hold gesture wherein the user holds and performs a pattern using the cursor while the region of interest is being selected may trigger an operation to be performed on the selected region of interest.

At 250, output of the processed document image including the region of interest selected may be presented to the user through touch-sensitive display 110.

The foregoing illustrates various aspects of the invention. It is not intended to be exhaustive. Rather, it is chosen to provide the best illustration of the principles of the invention and its practical application to enable one of ordinary skill in the art to utilize the invention, including its various modifications that naturally follow. All modifications and variations are contemplated within the scope of the invention as determined by the appended claims. Relatively apparent modifications include combining one or more features of various embodiments with features of other embodiments.

The invention claimed is:

1. A method for selecting a region in an image having substantially connected pixels representing content of the image, the image displayed in a touch-sensitive user interface, comprising:
   identifying one or more areas in the image having the substantially connected pixels indicating the content of the image without performing character recognition;
   receiving coordinates of a touch input on the touch-sensitive user interface that indicates the region in the image the user requests to select via the touch input;
   if the coordinates of the touch input are located in the one or more areas having the substantially connected pixels indicating the content of the image, determining the substantially connected pixels in the image that are located at a specified proximity from the coordinates of the touch input; and
   bounding the substantially connected pixels located at the specified proximity from the coordinates, the bounded substantially connected pixels indicating the region the user selects using the touch input,
   wherein the touch input is a text selection gesture and the identifying the one or more areas in the image having substantially connected pixels representing content of the image includes applying a morphology dilation filter to the image to form one or more lines of connected pixels and forming a bounding box having a left side corresponding to starting lines of the lines of connected pixels, a right side corresponding to end lines of the lines of connected pixels and a centroid corresponding to a mean position of each of the lines of the connected pixels.

2. The method of claim 1, further comprising determining if the coordinates of the touch input is in an area within the bounding box, and upon positive determination, selecting the lines of connected pixels within the bounding box as the region by highlighting the lines of connected pixel components within the bounding box with a first color.

3. The method of claim 1, further comprising associating an action performed by the user using the touch input for selecting the region with an action to be performed on the bounded region of interest.

4. The method of claim 3, wherein the associating the action includes determining if the touch input is moved from one direction to a second direction when selecting the region and upon positive determination, deleting the selected region of interest by replacing the highlighted one or more connected pixels with a color different from a color of the one or more connected pixels.

\* \* \* \* \*